United States Patent [19]
Negishi

[11] Patent Number: 4,974,138
[45] Date of Patent: Nov. 27, 1990

[54] LIGHTING DEVICE

[76] Inventor: Masataka Negishi, 29-19, Daito 2-Chome, Urawa-Shi, Saitama-Ken, Japan

[21] Appl. No.: 272,896

[22] Filed: Nov. 18, 1988

Related U.S. Application Data

[60] Division of Ser. No. 186,777, Apr. 25, 1988, Pat. No. 4,809,147, which is a continuation of Ser. No. 941,559, Dec. 11, 1986, abandoned, which is a continuation of Ser. No. 731,627, filed as PCT JP84/00404 on Aug. 20, 1984, published as WO85/01116 on Mar. 14, 1985, abandoned.

[30] Foreign Application Priority Data

Aug. 19, 1983 [JP] Japan .................. 58-151810

[51] Int. Cl.$^5$ ............................. F21V 7/00
[52] U.S. Cl. .................... 362/347; 362/297; 362/346
[58] Field of Search ............... 362/61, 80, 296, 297, 362/341, 346, 347; 350/629, 630

[56] References Cited

U.S. PATENT DOCUMENTS

| | | | |
|---|---|---|---|
| 1,235,276 | 7/1917 | Wood | 362/347 |
| 1,421,382 | 7/1922 | Beard | 362/347 |
| 3,609,340 | 9/1971 | Habro | 362/347 |
| 4,809,147 | 2/1989 | Negishi | 362/347 |

FOREIGN PATENT DOCUMENTS

| | | | |
|---|---|---|---|
| 1037652 | 9/1953 | France | 362/347 |
| 16-8302 | 6/1941 | Japan . | |
| 40-21920 | 9/1965 | Japan . | |

Primary Examiner—Stephen F. Husar
Attorney, Agent, or Firm—Wenderoth, Lind & Ponack

[57] ABSTRACT

A lighting device having a light source L and a reflector R positioned behind the light source is disclosed in which a three-dimensional configuration is given to the reflector R with the aid of the computer so that it can provide a particular reflection pattern to the light reflected by the reflector R. Due to a particular curvature or configuration of the reflecting surface of the reflector R, the light rays emanating from the light source and reflected at any point on the reflecting surface intersect or cut across each other at innumerable different points in space. Further, the reflector is provided with a three-dimensional curvature or shape so that it can give the incident light rays a preselected luminous flux distribution. The lighting device is adapted for application in a variety of uses enabled by its special reflection paths of light rays.

5 Claims, 5 Drawing Sheets

LIGHTING DEVICE

This application is a division of application of Ser. No. 07/186,777, filed Apr. 25, 1988, now U.S. Pat. No. 4,809,147, which in turn was a continuation of application Ser. No. 06/941,559, filed Dec. 11, 1986, now abandoned, which in turn was a continuation of application Ser. No. 06/731,627, filed as PCT JP84/00404 or Aug. 20, 1984, published as WO85/01116 on Mar. 14, 1985, now abandoned.

TECHNICAL FIELD

This invention relates to illumination or lighting devices, and, more specifically, to a lighting device consisting of mainly a light source and a novel reflective structure for reflecting rays emanating from the light source.

BACKGROUND ART

In prior art lighting devices a reflector placed in a spaced relationship behind a light source for reflecting light rays emanating from the light source was either a suitably shaped reflective mirror facing in a given direction in which the area to be illuminated is located, or a reflective mirror with a particular geometrical shape. The former reflective mirror aimed primarily at reflecting, in a desired direction, light rays emanating from the light source toward the mirror, to utilize the light efficiently, and no emphasis was placed on geometrical control of reflected light rays. On the other hand, the latter reflector was typically either a parabolic reflector having a surface of revolution of a parabola or an elliptic reflector with a surface of revolution of an ellipse. As is well known, light rays which emanate from a point light source at the focus of a parabolic reflector are collimated or made parallel, after they are reflected by the reflector. Also known is a fact that light rays emanating from a point light source at one of the focuses of an elliptic reflector converge at the other focus of the ellipse and simply radiate therefrom. Thus both of them were limited to particular uses and functions.

The prior art reflectors therefore have limitations in that although they were capable of either collimating or diverging light rays after they are reflected by virtue of their geometrical shape, they were not capable of commanding free and complete control over reflected light rays and distributions of luminous fluxes.

Meanwhile, as will be described later, it is known that when light is emitted from a point light source to a reflecting surface behind it, a solid angle corresponding to a given plane angle differs significantly depending upon the angular location of the reflecting surface with respect to the light source. The design of a light reflector of a conventional lighting device was carried out within the framework of the above-noted known principle.

The present invention was made in view of the aforesaid practices and limitations, and the object of the invention is to provide an improved or novel illuminating or lighting device having a new and useful reflector structure capable of freely controlling both the direction of light rays and the density of luminous fluxes, and further capable of obtaining desired luminous flux distribution at any area to be lighted in connection with, and in consideration of the light distribution characteristics of the light source.

DISCLOSURE OF THE INVENTION

In accordance with the present invention, a particularly useful structure for a reflector is provided in which any light ray reflected at any point on the reflecting surface of the reflector, when viewed in a direction perpendicular to the optical axis, intersects or cuts across innumerable light rays which are also reflected at innumerable other points on the reflector. The reflector further permits incident light rays to be reflected in a manner giving luminous flux distribution of any desired or preselected characteristics.

BEST MODES FOR CARRYING OUT THE INVENTION

The objects, features and advantages of the invention will become clearer from the following detailed description of the best modes for carrying out the invention.

Figures 1, 2:
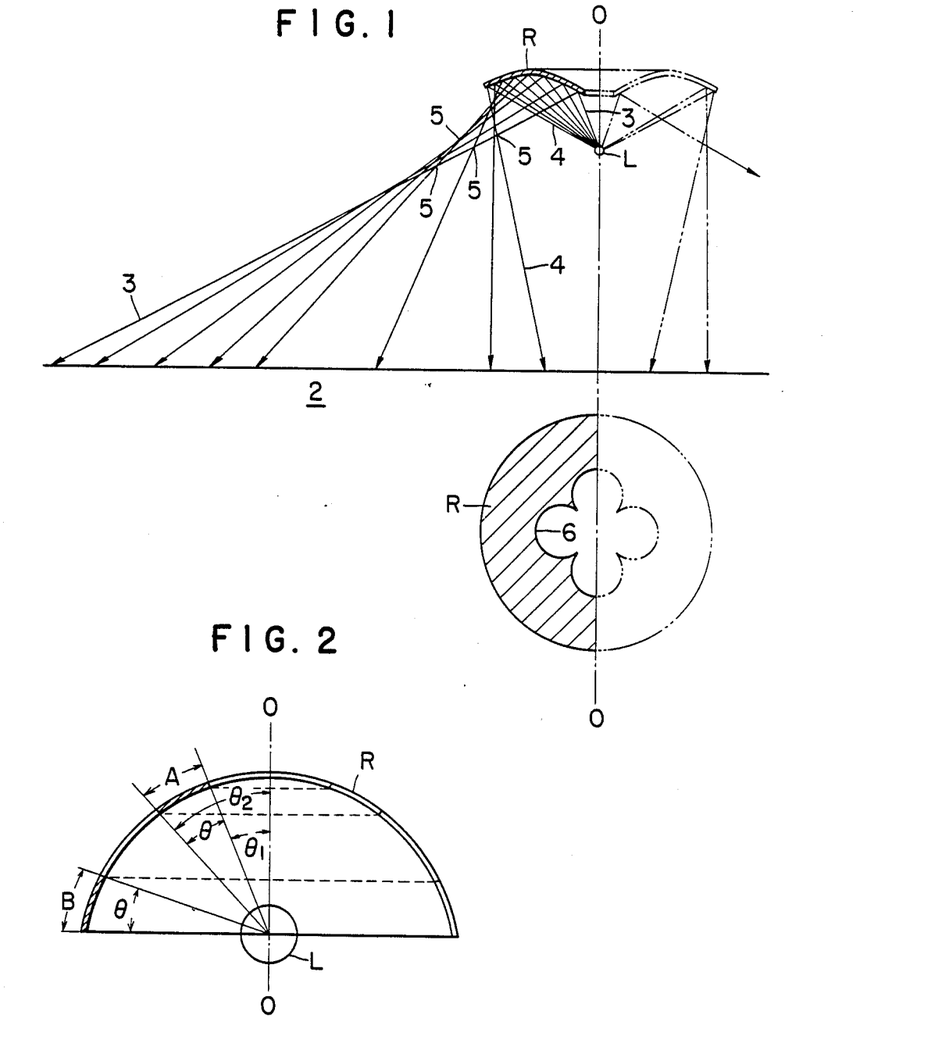
FIG. 1 is a diagrammatic view showing a first embodiment of the lighting device in accordance with the present invention.
FIG. 2 is a view explanatory of a relationship between a plane angle and a solid angle in connection with a point light sources and a reflector.

Referring now to FIG. 1, an illumination or lighting device in accordance with the first principle of the present invention includes a light source L for producing light rays and a reflector R provided adjacent to said light source L for reflecting light rays emanating from the light source. The light rays reflected by the reflector R are directed toward a surface 2 to be illuminated. In the lighting device, the optical system including the light source L and the reflector R has an optical axis O—O, and the reflector R is formed symmetrically with respect to the optical axis O—O.

The reflector R is formed to have a shape such that a light ray emanating from the light source L and reflected at any point on the reflecting surface of the reflector intersects or cuts across innumerable light rays which are reflected at any other innumerable points on the reflecting surface, at innumerable different points in space between the surface 2 being illuminated and the reflector R. Further, the curvature or shape given to the reflecting surface of the reflector R is designed to give the reflected light rays with a predetermined luminous flux distribution.

More specifically, the shape of the reflecting surface of the reflector R is designed such that a light ray 3 from the light source L, reaching the reflector R at a point nearest to the optical axis O—O, is reflected thereby so as to be directed to a point on the surface 2 farthest from the optical axis O—O, and that a light ray 4 from the light source L, reaching the reflector R at a point farthest from the optical axis O—O, is reflected thereby so as to be directed to a point on the surface 2 nearest to the optical axis O—O (or to a point on the surface 2 on the opposite side with respect to the axis O—O). Incident light rays reaching the reflector R in the area between the ray 3 and the ray 4 are reflected so as to be directed to the area on the surface 2 midway between the farthest or outermost and the nearest or innermost areas with respect to the optical axis O—O. To the farther point on the reflector R from the optical axis O—O the incident ray reaches, and to the nearest point on the surface 2 from the optical axis O—O reaches the reflected light.

It will be understood from the foregoing that the light rays reflected by a part of the reflector R on the same side thereof with respect to the optical axis O—O are caused to intersect or cut across each other at innumerable different points 5.

If desired, it is also possible, depending upon the characteristics of the light source, to make the luminous flux distribution given by the reflector R denser as the reflected light rays are directed farther from the optical axis O—O, for the purpose of obtaining a uniform intensity of illumination throughout the surface 2. A skilled person has no difficulty in designing the reflector R so as to have any other distribution of intensity of illumination on the surface 2 to be illuminated. The shape and dimensions of the reflector R for obtaining desired directions of reflected light and luminous flux distribution can be designed with the use of a computer, if conditions for design are given.

In an additional feature of the present invention, both the range of reach of the reflected rays and the geometrical shape of the area on the surface 2 being illuminated can be varied as desired. For example, if a square-shaped area is to be illuminated, the projected plan form of the reflector R as viewed in the direction of the optical axis O—O of the reflecting surface is as shown in hatching at the bottom of FIG. 1. In the figure the reflector R is provided with a petal-shaped central aperture 6 at the central region, the contour line of the petal-shaped aperture corresponding to the four sides of the square-shaped area being illuminated.

The particular usefulness and utility of the lighting device described above are as follows.

In the known lighting device, the portion of the light rays emanating from the light source which reaches the reflecting area of the reflector immediately behind the light source is reflected back to the light source, tracing the same original path, and is thereby prevented by the light source from illuminating the area to be illuminated located in front of the light source. Because of the physical volume of the light source, a not insignificant portion of the light from the light source is left unutilized. Therefore, it can be said that the portion of the reflecting surface immediately behind the light source does not have a reflecting function.

For better understanding of the invention, reference will be made to FIG. 2. Assume that there is provided a point or a spherical light source L emitting uniform intensity light in all directions and a hemispherical reflector structure R encircling the light source and concentric with. Let us consider a set of plane angles $\theta_1$, $\theta_2$ and $\theta(\theta_2-\theta_1)$ each with respect to the light source L. The solid angle for the plane angle $\theta$ is given by $2\pi(\cos\theta_1-\cos\theta_2)$. The solid angle $2\pi(\cos\theta_1-\theta_2)$ takes a variety of values as $\theta_1$ and $\theta_2$ are changed even though $\theta$ itself is maintained constant. In other words, for all the same value of the plane angle $\theta$, the solid angle will be progressively greater as the arc subtended by the plane angle $\theta$ is angularly farther from the optical axis O—O.

More specifically, if two annular reflecting surface portions A and B each having an equal plane angle $\theta$ are considered as shown in FIG. 2, the solid angle for the reflecting surface portion B is greater than that for the reflecting surface portion A. This means that the annular reflecting surface portion of smaller solid angle, angularly nearer to the optical axis O-13 O, receives less light rays and the annular reflecting surface of greater solid angle, angularly farther from the optical axis O—O, receives more light rays so that the annular portion B receives more light rays than the annular portion A. However, in a conventional lighting device, light rays reflected from a reflecting surface portion near the optical axis are mainly used, and light rays from the light source directed toward the greater-solid-angle portion are not used effectively by reflection by a reflector.

The lighting device as shown in FIG. 1 is designed to eliminate the deficiency encountered in the conventional lighting device. It will first be appreciated that the light rays emanating from the light source L and reaching the region of the reflector R immediately behind the source L are reflected to be directed to an area of the surface 2 farthest from the optical axis O—O. Therefore, the reflected light rays can reach the surface 2 without being hindered by the light source L even if it has a considerable volume. On the other hand, light reaching the area of the surface 2 near the optical axis O—O is one having a great number of light rays which are reflected at the peripheral portion of the reflector R and which have not been utilized heretofore. Thus, all of the light rays from the light source L can be used effectively with increased lighting efficiency.

If a precise design of a shape of the reflecting surface of the reflector is made so as to direct a greater number of luminous fluxes to the peripheral portion of the surface 2, a perfectly uniform distribution of intensity of illumination on the area to be illuminated can be achieved. It is even possible to make a design of the reflector in which the outer portion of the area to be illuminated is given a greater intensity of illumination or in which any other different distribution of intensity of illumination on the area to be illuminated is obtained.

The petal-shaped aperture 6 in the center of the reflector R as shown in FIG. 1 can serve to provide a space for accommodating equipment such as an electrical terminal or a lamp socket etc. without sacrificing the overall performance of the lighting device. Further, it is possible to make the lighting device compact by displacing the light source L closer to the reflector R, utilizing the aperture 6.

The above stated principle can be applied also to a case wherein there are one and the other sides with respect to a plane passing through the optical axis O—O.

Figure 3:
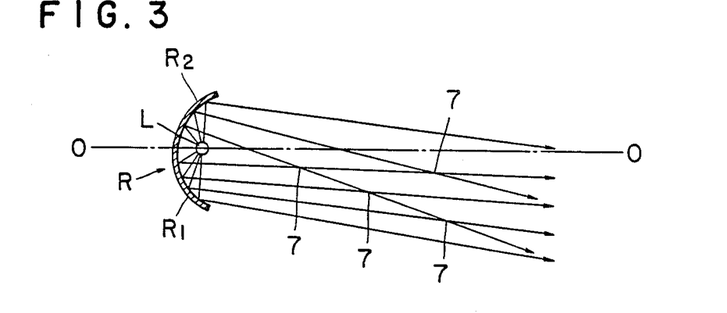
FIG. 3 is a diagrammatic view showing a second embodiment in accordance with the principle of the present invention.

FIG. 3 shows a second principle of the present invention, which can be applied to automobile headlights, for example. In the figure, the lower half $R_1$ of a reflector R placed behind a light source L is provided with a configuration such that light rays reflected thereby will have a predetermined luminous flux distribution, for example, a uniform luminous flux distribution and will be directed below the horizontal plane passing through the optical axis O-13 O so as to be radiated to the area to be illuminated, i.e., the road surface. On the other hand, the upper half $R_2$ of the reflector R located above the horizontal plane passing through the optical axis O—O has a shape different from that of the lower half $R_1$ and such that all of the light rays reflected thereby will cross the horizontal plane and pass therethrough to the lower side of the plane. The light rays then will join the rays reflected by the lower half $R_1$ of the reflecting surface and illuminate the road surface. In this particular example, also, the upper reflector portion $R_2$ can be configured also to give a predetermined light ray distribution, for example, a uniform luminous flux distribution.

It will be apparent from the foregoing that, in this embodiment, since light rays reflected at the upper side of the reflector R are directed across the horizontal plane passing through the optical axis O-13 O to the other or lower side, the rays from the upper side intersect the light rays reflected at the lower side of the reflector at innumerable different points 7 in the space.

Figure 4:
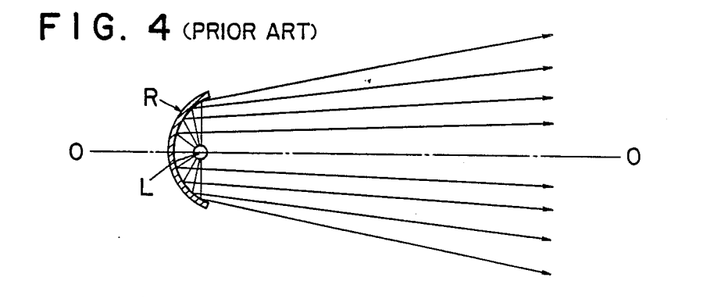
FIG. 4 is also a diagrammatic view showing an example of a conventional lighting device.
Figure 5:
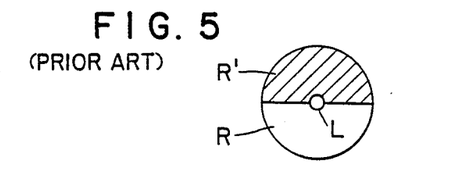
FIG. 5 is a view explanatory of insufficiency in performance of the conventional lighting device shown in FIG. 4.

In a conventional lighting device as shown in FIG. 4, at the lower side with respect to the optical axis O-13 O, light rays emanating from the light source L and reflected by the reflector R are directed to the road surface and therefore are useful. However, with regard to the upper half portion in respect of the optical axis O—O, light rays are not utilized fully for illuminating the road surface and may rather be harmful to oncoming cars running in the opposite direction, such light rays being reduced, for example, by directing the entire lighting device slightly downward. It can be said, therefore, that the hatched upper reflecting portion R' shown in FIG. 5, as opposed to the lower half R, is not fully useful.

In contrast, in the lighting device shown in FIG. 3, the light rays reflected from the upper reflecting portion $R_2$, the upper half with respect to the optical axis O—O, join the light rays reflected from the reflecting portion $R_1$, the lower half with respect to the optical axis O—O, to be radiated in the forward direction for illumination without harmful effects on oncoming cars, and increase the intensity of illumination on the road surface which is in need of lighting.

In this example, as well, the luminous flux distribution as a result of the reflection by the reflecting portion $R_1$ and $R_2$ can be arbitrarily designed in any desired distribution. As a matter of fact, the principle described above can be applied to lighting devices other than a headlight of an automobile.

In this embodiment also, the problem involving solid angles as discussed previously can be solved by employing three-dimensional design of the configurations of the reflecting portions $R_1$ and $R_2$ and choosing any desired luminous flux distributions.

Although the principle of the FIG. 3 was described in respect of the horizontal plane passing through the optical axis O—O, the application is not limited to such a case but can be extended to a case where one and the other sides are in respect of the optical axis O—O (not the plane).

Figure 6:
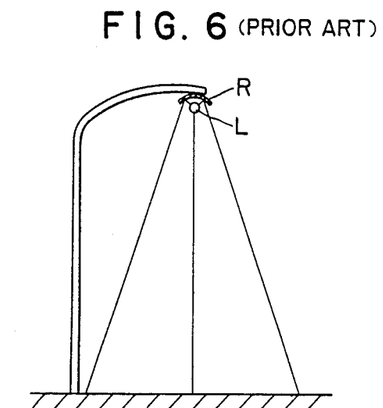
FIG. 6 is a view showing a road surface lighting device of prior art.
Figure 7:
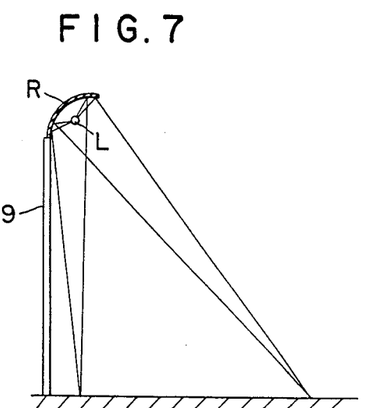
FIG. 7 is a view showing a road surface lighting device incorporating the principle of the present invention as shown in FIG. 3.

Another application is found for road surface illumination by a fixed illuminating device in addition to headlights for automobiles. Referring to FIG. 6 in which a conventional fixed type road surface illumination lamp is shown. As shown, a lamp support pole is erected fixedly and extended upright from the road surface with the uppermost part curved inwardly and generally horizontally over the middle of the road to provide a fixture for an illumination device so that the lamp itself may be positioned over the middle of the road surface to be illuminated. The application of the concept of FIG. 3 of the present invention to the fixed road illuminating apparatus enables the use of a straight pole 9, as shown in FIG. 7, for supporting the illumination lamp by mounting it on the upper end of the straight pole and directing the reflected rayon with desired distribution, which otherwise would be directed to a region out of the road surface, to the central region of the road. It will be understood that this embodiment provides the same effectiveness as the embodiment shown in FIG. 3.

Figures 8, 9, 10, 11:
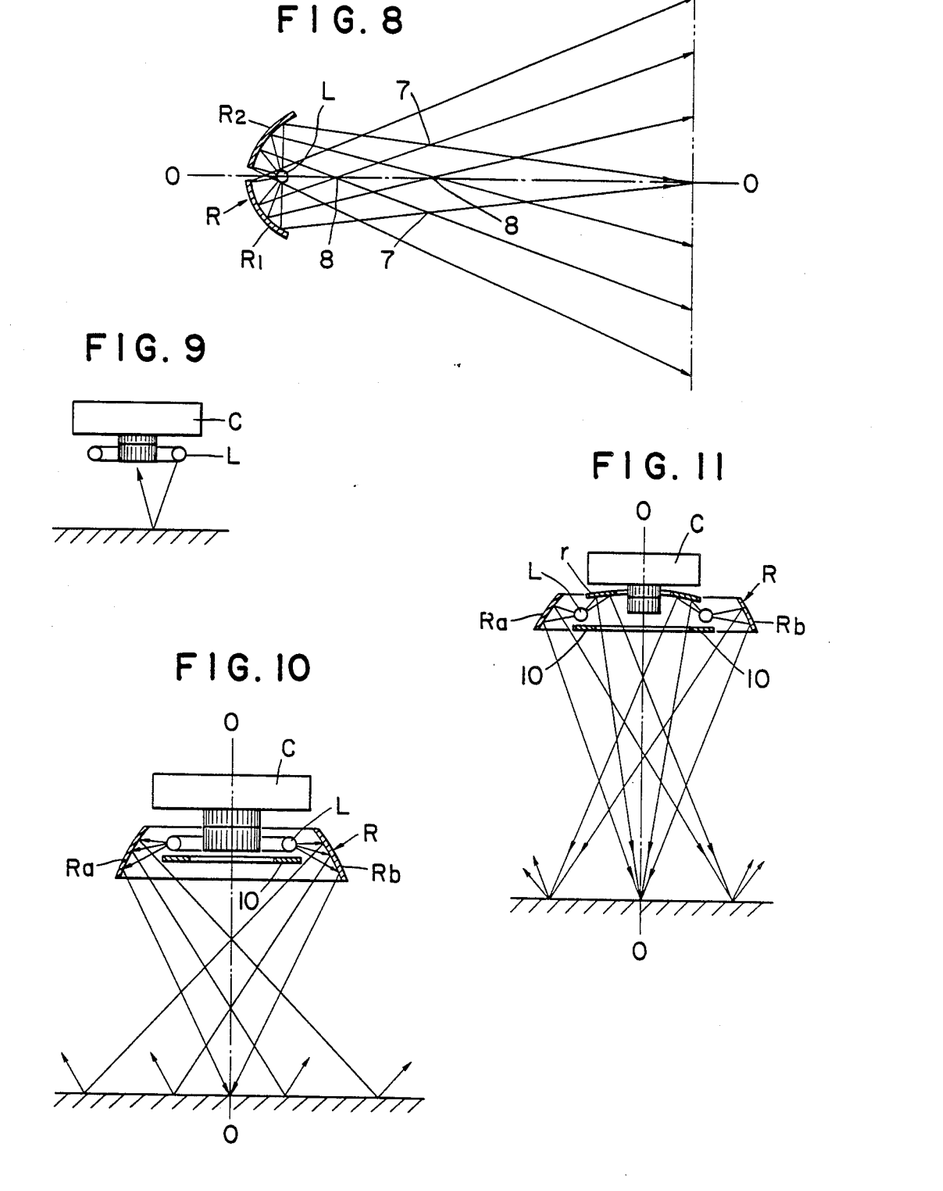
FIG. 8 shows diagrammatically a third embodiment in accordance with the principle of the present invention.
FIG. 9 is a view explanatory of a difficulty encountered at a close shot with a camera.
FIG. 10 is a view, partly in vertical section, of a close shot photographing device incorporating the principle of the present invention as shown in FIG. 8.
FIG. 11 is a view, partly in vertical section, of a modified form of a close shot photographing device as shown in FIG. 10.

FIG. 8 shows a third principle of the present invention. According to the third principle, light rays emitted from a light source L and reflected by a reflector surface portion $R_2$ are directed so as to intersect the optical axis O—O or the horizontal plane including the optical axis O—O to reach the opposite side in respect of the plane, with a predetermined luminous flux distribution, for example, a uniform luminous flux distribution, throughout the horizontal width of the reflector surface. The light rays then will be radiated to the area to be illuminated. Similarly, the other half of the reflector portion $R_1$ reflects the light rays from the source L so as to cause them to intersect the optical axis O—O or the plane passing therethrough and reach the area to be illuminated on the upper side with respect to the optical axis O—O, with a predetermined luminous flux distribution, for example, a uniform luminous flux distribution. By doing so, the reflected light rays from the reflector portions $R_1$ and $R_2$ intersect each other at innumerable points 7 in the space. If the reflector portions and therefore the reflected rays are symmetrical in respect of the optical axis O—O or the plane including it, the reflected lights from the opposite sides intersect each other also at points 8 on the optical axis O—O.

If it is desired in this embodiment to have a square illuminated area on a plane perpendicular to the optical axis O—O, the projective plane shape, as viewed along the optical axis O—O, of the reflecting surface of the reflector R will be similar to the hatched portion shown in FIG. 1. It will be understood that in this embodiment also, the problem of insufficiency in utilizing light rays is eliminated.

The concept of FIG. 8 can be applied to lighting for a close shot in photography.

FIG. 9 shows a camera C and an object to be photographed at a close shot distance. If an object has a light reflecting characteristic, in particular, when a light source L such as a stroboscope flash light is provided in the vicinity of the camera and is flashed, the light rays emanating from the stroboscope are reflected from the surface of the object to be taken and reach directly the optical lense as shown by the arrow. Thus, an adverse effect is caused on the image forming portion of the camera. This disadvantage can be eliminated by using the concept shown in FIG. 8.

In the example shown in FIG. 10 there is provided a ring or doughnut-shaped light source L such as a stroboscope flash light, etc. The light source L is surrounded by an umbrella-shaped light reflector R and also provided with an annular light block member 10 immediately beneath the light source L so extending that the light rays emanating from the light source L are prevented from directly reaching the areas to be illuminated. The reflector R is formed to have a particularly designed inner reflecting surface portions Ra and Rb in a plane passing through the optical axis O—O such that light rays reflected by one reflecting surface portion $R_1$ or $R_2$ are directed to the other side in respect of the optical axis O—O or a plane passing through it with a predetermined light distribution.

The light reflector structure as described above permits the light rays to reach the object and be reflected thereby to the area outside the lens of the camera C, thus eliminating the above mentioned adverse effect and ensuring excellent photographing.

FIG. 11 shows a modified example of FIG. 10. The example is further provided with an annular inner reflector r which is slightly concave downwardly and has a central aperture to accommodate a portion of the camera C, such as a projecting lens body. The inner reflector r is designed so that the light rays reflected on one side of the reflector r with respect to the optical axis O—O intersect the light rays reflected on the other side of the reflector r on the optical axis O—O. Additionally, in this example, any desired light rays are directed to the outside of the lens area.

The principle shown in FIG. 8 can be applied to other various lighting devices. For example, an effective use is found in printing where a similar technique of illumination to that for a close shot by photography is required. Also, the concept of FIG. 8 can be adapted for road surface illumination in like manner as shown in FIG. 7.

It will be noted that in the embodiment shown in FIG. 1 light rays reflected on one side of the reflecting surface with respect to the optical axis O—O intersect or cross each other at innumerable points on that side of the reflecting surface, while in the embodiments shown in FIGS. 3 and 8 light rays reflected on a certain portion of one side of the reflecting surface with respect to the optical axis O—O are directed to the other side of the reflecting surface.

Figure 12:
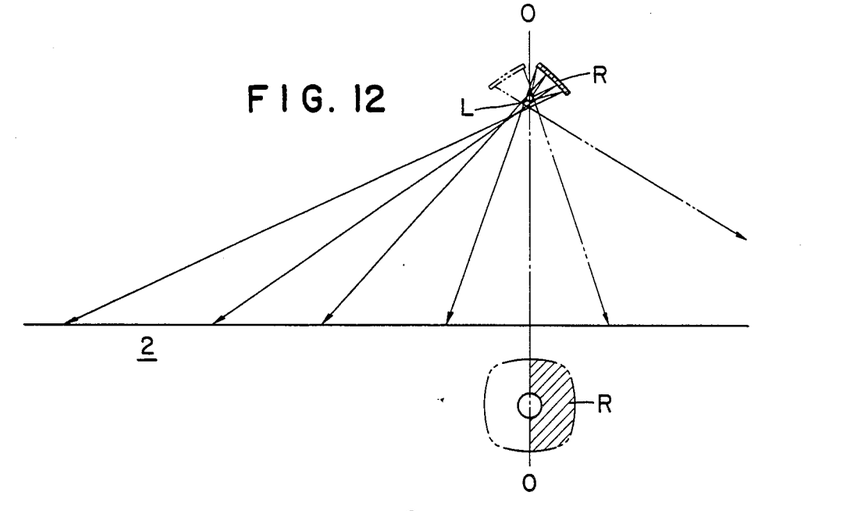
FIG. 12 is a diagrammatic view showing a fourth embodiment in accordance with the principle of the present invention.

The fourth principle of the present invention shown in FIG. 12 is a combination of the above stated two principles. As shown on an enlarged scale in FIG. 13, light rays emitted from a light source L and reflected by a reflector R are directed, similarly as in FIGS. 3 and 8, toward the opposite side with respect to the optical axis O—O, and, similarly as in FIG. 1, intersect each other, at innumerable points 12 on the other side. The reflecting surface of the reflector R in this embodiment is also designed so that the area or surface 2 to be illuminated receives reflected light rays of a predetermined pattern and desired luminous flux distribution. In this embodiment, if a square pattern illumination is desired on the surface 2 to be illuminated, the shape of the reflector R is in a generally square shape with round corners as shown by the hatched area R at the bottom of FIG. 12.

Figure 14:
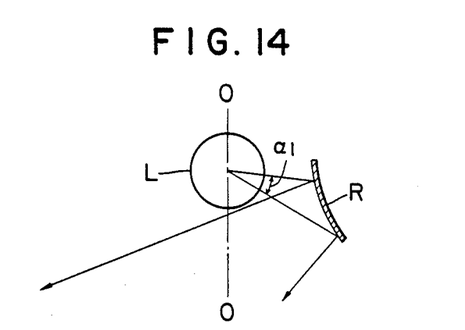
FIGS. 14 and 15 are diagrammatic views for comparison, illustrating the utility and usefulness of the fourth embodiment shown in FIG. 12.
Figure 15:
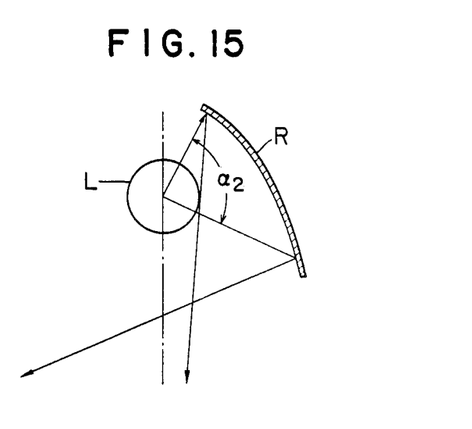

The embodiment in FIGS. 12 and 13 has an advantage which cannot be obtained in the embodiment shown in FIG. 8 as will be explained below. Referring to FIG. 14, similar in concept to that shown in FIG. 8, light rays from the light source L are reflected on the reflector R and advance to the opposite side with respect to the optical axis O—O. But, because the light source L has a volume and occupies a certain space near the reflector, a number of light rays from the light source, after being reflected on the reflecting surface thereof, are blocked by the light source and cannot advance toward the opposite side. Therefore, the amount of light rays available for use is limited to the light rays which are within the range of an angle $\alpha_1$. But, the solid angle corresponding to the plane angle $\alpha_1$ is quite small, resulting in low efficiency in the use of light. As opposed to this, in accordance with the principle illustrated in FIGS. 12 and 13, much more reflected light rays can be utilized in a greater range of plane angle $\alpha_2$, as will be understood from FIG. 15. Being much larger than the angle $\alpha_1$, the angle $\alpha_2$ serves to accomplish a higher efficiency in the use of light from the light source. Consequently, according to the principles described in connection with FIGS. 12 and 13, the advantage of higher efficiency in the use of light can be obtained in addition to the advantages obtainable in the principle of FIG. 8.

Figure 13:
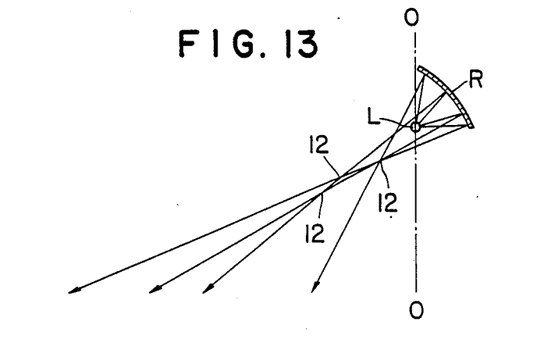
FIG. 13 is a fragmentary enlarged view of FIG. 12.
Figure 16:
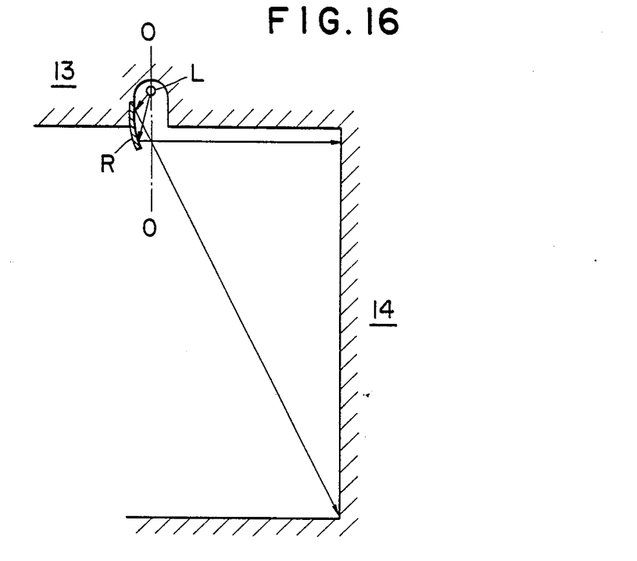
FIGS. 16 and 17 are sectional views, in elevation, of two examples of ceiling-mounting type lighting device in accordance with the principle of the fourth embodiment of the present invention.

In FIG. 16 a lighting device in accordance with the concept taught in FIGS. 12 and 13 is shown. In this example, a light source L is provided inside a recess formed in the ceiling 13 of a room. This lighting device, even with the light source L in the recess, allows full illumination over the side wall 14 from the floor to the ceiling. This cannot be achieved with conventional types of lighting devices.

Figure 17:
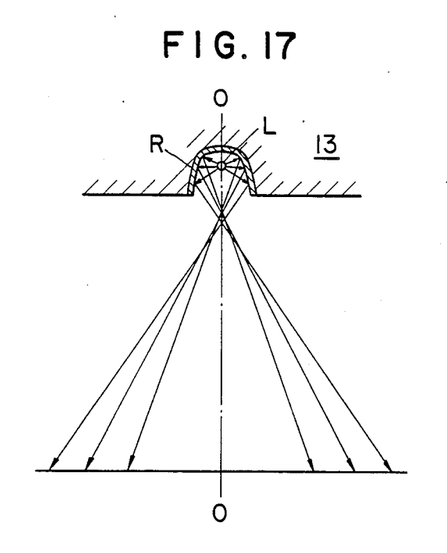

FIG. 17 shows another embodiment according to the principle of FIGS. 12 and 13 in which a light source L is also provided in a recess formed in the ceiling 13 and is surrounded by a reflector R. This example enables illumination of a extensive floor space with the light source L in the recess.

Figure 18:
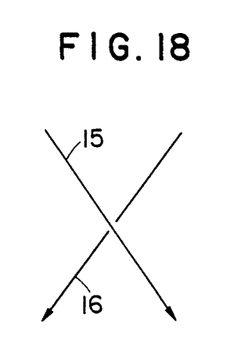
FIG. 18 shows two reflected light rays being directed in different planes, another example of intersection or crossing in the present invention.

In the detailed description thus far provided, it has been assumed that light rays intersect each other in an imaginary plane. However, as shown in FIG. 18, a reflector can be so designed that, when seen in a direction perpendicular to the optical axis, the light rays intersect each other, though in the three-dimensional space they simply pass one another without contact. The present invention also encompasses such a case. Further, the spirit of the present invention can be applied not only to a symmetrical optical system shown in the drawings but also to an asymmetrical optical system. In addition, the light source can be a point source, linear source or a ring-shaped source, and the reflecting surface of the reflector can be constituted by a Fresnel mirror.

As has been described with respect to the preferred embodiments of the invention, this invention enables the lighting to be controlled in the most appropriate condition according to various purposes, uses and demands, and the highest efficiency in the use of light.

INDUSTRIAL APPLICABILITY

The present invention, as described hereinabove, is adapted for use in general interior and exterior illuminations, photography, coloration for printing and other numerous industrial illumination devices.

What is claimed is:

1. In a lighting system having a light source, a reflector for reflecting light rays emanating from the light source, said light source and said reflector having an optical axis, and a surface to be illuminated, said surface confronting said reflector and extending across said optical axis, the improvement wherein said reflector includes at least a partially continuous reflecting surface and is formed such that light rays reflected by the reflecting surface on the same side thereof with respect to the optical axis or a plane passing therethrough, when viewed in a direction perpendicular to said optical axis or in a direction included in said plane, intersects other light rays reflected at other points on the same side of said reflecting surface at innumerable different points on the same side, said reflecting surface being so shaped that the light rays reflected thereby are given a uniform luminous flux distribution on said surface to be illuminated.

2. The improvement as claimed in claim 1, wherein said reflector extends from an innermost portion nearest the optical axis or plane to an outermost portion furthest from the optical axis or plane, said reflector having, on the same side of the optical axis or plane, a shape for causing all of the light rays to be reflected such that the nearer the point of reflection on the reflector is to the optical axis or plane, the further from the optical axis or plane is the point at which the reflected rays impinge upon said surface to be illuminated.

3. A lighting system comprising: a light source; a reflector for reflecting light rays emanating from said light source, said light source and said reflector having an optical axis; and a surface to be illuminated, said surface confronting said reflector and extending across said optical axis, said reflector having at least a partially continuous reflecting surface of a shape symmetrical with respect to said optical axis, having no focal point and having a shape for causing light rays reflected by the reflecting surface on one side of said optical axis, when viewed in a direction perpendicular to said optical axis, to intersect other light rays reflected by said reflecting surface on said one side of the optical axis at innumerable different points which are distributed in three dimensions both in the direction of said optical axis and transversely thereof, said reflecting surface having a shape for reflecting the light rays therefrom as non-parallel rays with a uniform luminous flux distribution on said surface to be illuminated.

4. The lighting system as claimed in claim 3, wherein said reflector extends from an innermost portion nearest the optical axis to an outermost portion furthest from the optical axis, said reflector having, on the one side of the optical axis, a shape for causing all of the light rays to be reflected such that the nearer the point of reflection on the reflector is to the optical axis, the further from the optical axis is the point at which the reflected rays impinge upon said surface to be illuminated.

5. A lighting device comprising: a light source; and a reflector for reflecting light rays emanating from said light source, said light source and said reflector having an optical axis, said reflector having at least a partially continuous reflecting surface of a symmetrical shape with respect to a plane passing through said optical axis, having no focal point and having a shape for causing light rays reflected by the reflecting surface on one side of said plane, when viewed in a direction included in said plane, to intersect other light rays reflected by said reflecting surface on said one side of said plane at innumerable different points which are distributed in three dimensions both in the direction of said optical axis and transversely thereof, said reflecting surface having a shape for reflecting the light rays therefrom as non-parallel rays with a uniform luminous flux distribution.

* * * * *